United States Patent
Jaklin

(10) Patent No.: US 7,441,457 B2
(45) Date of Patent: Oct. 28, 2008

(54) FIXING ELEMENT FOR A SENSOR HEAD

(75) Inventor: Ralf Jaklin, Liederbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/570,399

(22) PCT Filed: Jul. 30, 2004

(86) PCT No.: PCT/EP2004/051669

§ 371 (c)(1),
(2), (4) Date: Nov. 3, 2006

(87) PCT Pub. No.: WO2005/026743

PCT Pub. Date: Mar. 24, 2005

(65) Prior Publication Data

US 2007/0119251 A1 May 31, 2007

(30) Foreign Application Priority Data

Sep. 15, 2003 (DE) ............................. 103 42 863

(51) Int. Cl.
*G01P 1/02* (2006.01)
(52) U.S. Cl. ................. 73/494; 73/865.9; 411/908
(58) Field of Classification Search ............... 73/494, 73/865.9; 411/908
See application file for complete search history.

(56) References Cited

U.S. PATENT DOCUMENTS

| | | | | |
|---|---|---|---|---|
| 3,867,047 A | * | 2/1975 | Wightman et al. | 403/242 |
| 5,428,289 A | * | 6/1995 | Sahashi et al. | 324/173 |
| 5,470,157 A | * | 11/1995 | Dougherty et al. | 384/448 |
| 5,762,425 A | * | 6/1998 | Ouchi | 384/448 |
| 6,127,819 A | | 10/2000 | Ouchi | |
| 6,237,970 B1 | * | 5/2001 | Joannou | 292/241 |
| 6,463,818 B1 | | 10/2002 | Stagg et al. | |

FOREIGN PATENT DOCUMENTS

| | | |
|---|---|---|
| DE | 36 26 052 A1 | 2/1987 |
| DE | G 88 05 874.3 | 9/1988 |
| DE | 41 35 789 A1 | 5/1992 |
| DE | 44 20 766 A1 | 12/1995 |

(Continued)

OTHER PUBLICATIONS

Hans, (Translation of DE 3626052 A1), Feb. 19, 1987.*

(Continued)

*Primary Examiner*—Hezron E. Williams
*Assistant Examiner*—Samir M. Shah
(74) *Attorney, Agent, or Firm*—Lucas & Mercanti, LLP

(57) ABSTRACT

A fixing element, is designed on a fixing ring (2) for a sensor head (1) measuring speed of rotation or angle of rotation of a wheel in a motor vehicle. The sensor head (1) has a housing (11) made of plastic, and at least one housing foot (5) fixed to the fixing ring (2) by the fixing element. The fixing ring (2) serves for fixing the sensor head (1) to a further component, such as a wheel bearing. The fixing element is configured as a T-shaped, twistable lug (7) with a retaining piece (10). The lug extends through a continuous, mainly slot-shaped or long-hole-shaped cutout (6) of the housing foot (5).

10 Claims, 2 Drawing Sheets

| | FOREIGN PATENT DOCUMENTS | | |
|---|---|---|---|
| DE | 195 37 039 A1 | 4/1997 |
| DE | 196 33 977 A1 | 2/1998 |
| DE | 198 47 863 C2 | 5/1999 |
| DE | 102 46 420 A1 | 4/2004 |
| EP | 0 675 364 A2 | 10/1995 |
| GB | 1 438 880 A | 6/1976 |

OTHER PUBLICATIONS

2006Q02542DE Richter—v. Voss; Bauelemente der Feinmechanik; 1949; pp. 108-121; 4th edition; Verlag Technik GmbH Berlin; Germany.

* cited by examiner

FIG 3 B-B
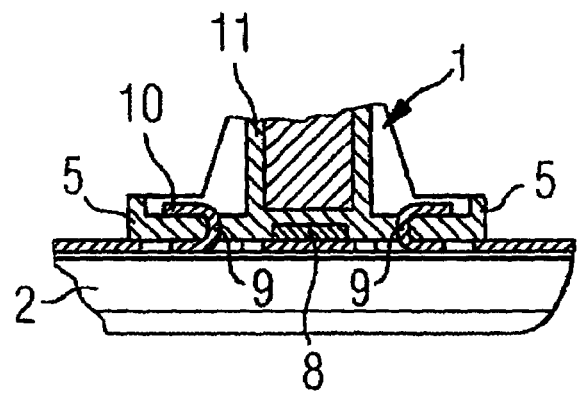
FIG 4
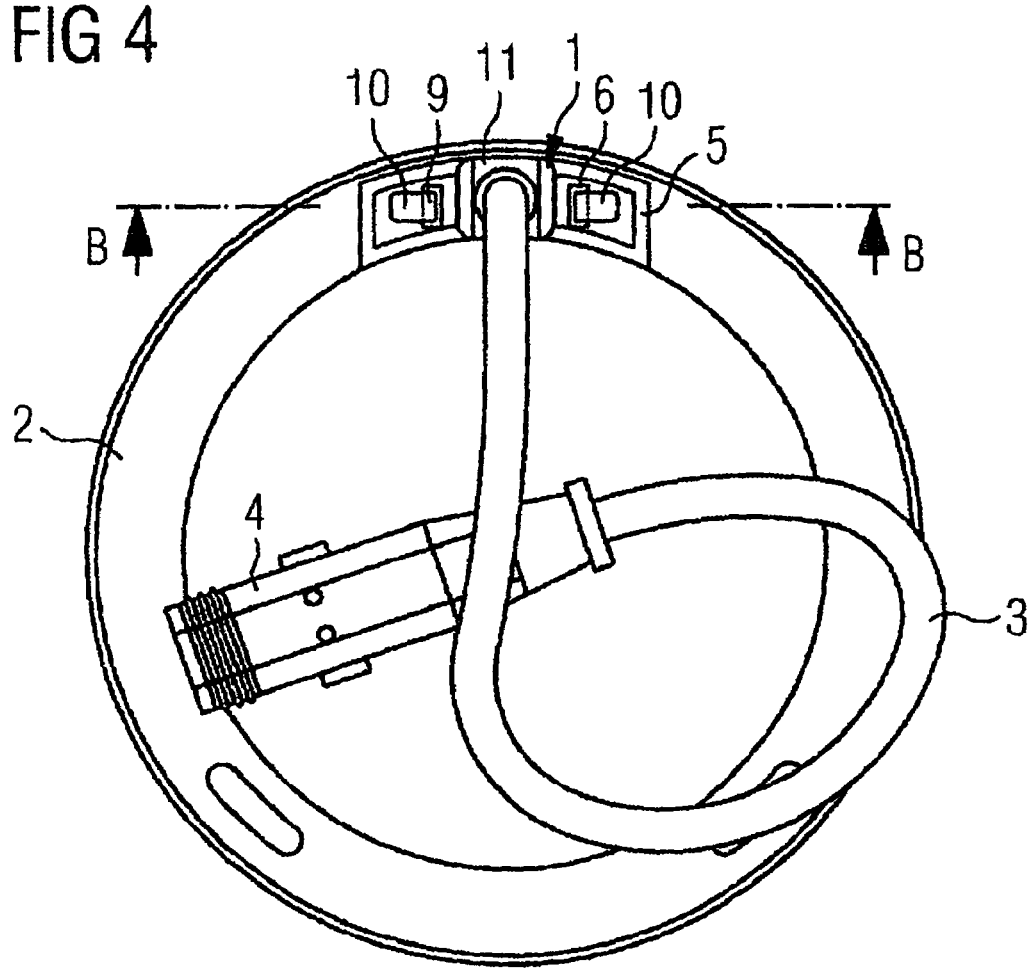

FIXING ELEMENT FOR A SENSOR HEAD

FIELD AND BACKGROUND OF THE INVENTION

The invention relates to a fixing element, designed on a fixing ring, for a sensor head, in particular for a sensor head for measuring speed of rotation or angle of rotation in a motor vehicle, the sensor head comprising a housing made of plastic with at least one housing foot designed thereon which is fixed to the fixing ring by means of the fixing element, and the fixing ring being intended for fixing the sensor head to a further component, for example a wheel bearing.

Sensor heads of the kind referred to in the introduction are used in motor vehicles for detecting the speed of rotation of a wheel, for example. In this connection, it is conventional to connect the sensor head to a fixing ring, which may be made of metal, for example. The fixing ring is in turn mounted on a wheel bearing in order to detect the speed of rotation of the supported wheel by means of the sensor head. According to the state of the art, connection of the sensor head to the fixing ring is effected by, for example, ultrasonic welding and/or injection-molding around the sensor head on the fixing ring.

These ways of connecting the sensor head to the fixing ring are relatively complicated and expensive.

SUMMARY OF THE INVENTION

It is therefore an object of the invention to connect the sensor head to the fixing ring in a particularly simple and cost-effective way.

According to the invention, this object is achieved by virtue of the fact that the fixing element is designed as a T-shaped, twistable lug with a retaining piece, which lug extends through a continuous, mainly slot-shaped or long-hole-shaped cutout of the housing foot, the retaining piece of the twistable lug lying on the housing foot outside the direction of extension of the long-hole-shaped cutout and the housing foot being clamped between the retaining piece and the fixing ring.

Alternatively, the object is also achieved by virtue of the fact that the fixing element is designed as a lug which can be bent off in a U-shape with a retaining piece, which lug extends through a continuous cutout of the housing foot, the retaining piece of the lug which can be bent over lying on the housing foot outside the continuous cutout and the housing foot being clamped between the retaining piece and the fixing ring.

By designing the fixing element as a T-shaped, twistable lug, particularly simple fixing of the sensor head to the fixing ring is made possible. For this, it is only necessary for the lug to be inserted through the mainly slot-shaped or long-hole-shaped cutout of the housing foot and for the retaining piece to be twisted until the housing foot is clamped between the retaining piece and the fixing ring. This fixing method is especially well-suited for mechanical production.

Particularly simple fixing of the sensor head to the fixing ring is also made possible by designing the fixing element as a lug which can be bent off in a U-shape. For this, the lug which can be bent off in a U-shape is inserted through a continuous cutout of the housing foot and the retaining piece is bent off until the housing foot is clamped between the retaining piece and the fixing ring. This is preferably also carried out in the course of mechanical production.

In a development, the T-shaped, twistable lug is made of a metal. Metals can be plastically deformed readily without breaking prematurely. The T-shaped, twistable lug can be produced as an integral component of the fixing ring. The T-shaped, twistable lug can easily be punched out from a metal fixing ring and bent into the desired position.

The lug made of metal which can be bent off in a U-shape can also be produced easily from a part of the metal fixing ring by punching and bending. The T-shaped, twistable lug or the lug which can be bent off in a U-shape can of course also be welded or bonded onto the fixing ring.

BRIEF DESCRIPTION OF THE DRAWINGS

Illustrative embodiments of the invention are described in greater detail below and illustrated in the drawings, in which

FIG. 3 shows a lateral section through the sensor head, and

FIG. 4 shows a top view of the fixing ring with the sensor head.

DETAILED DESCRIPTION OF THE PREFERRED EMBODIMENT(S)

Figure 1:
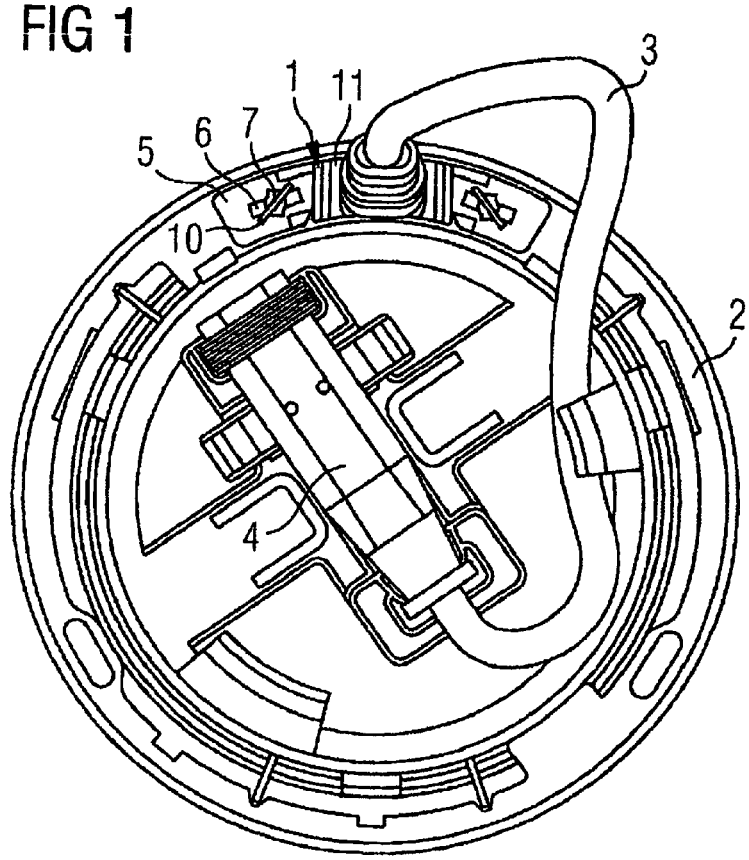
FIG. 1 shows a sensor head.

FIG. 1 shows a sensor head 1 on a fixing ring 2. A cable 3 runs from the sensor head 1 to a plug 4. The signals detected by the sensor are made available to the rest of the vehicle electronics via the cable 3 and the plug 4. The fixing ring 2 is pressed onto a bearing (not illustrated here). The signals generated by this bearing can be measured with the sensor head 1. In this way, the speed of rotation of a wheel of a motor vehicle can be determined, for example. The sensor head 1 comprises a housing 11 made of plastic, a component of which is a housing foot 5. A continuous cutout 6 is made in the housing foot 5. A twistable lug 7 designed on the fixing ring 2 is guided through the continuous cutout 6 of the housing foot 5 and twisted to such an extent that the retaining piece 10 comes to lie transversely to the continuous cutout 6 which is largely of slot-like design. The housing foot 5 is thus clamped between the retaining piece 10 and the fixing ring 2, by virtue of which the sensor head 1 is fixed firmly to the retaining ring 2. This form of fixing the sensor head 1 to the fixing ring 2 can be effected very simply. The fixing described of the sensor head 1 to the fixing ring 2 can be carried out mechanically, which reduces the production costs of the whole system.

Figure 2:
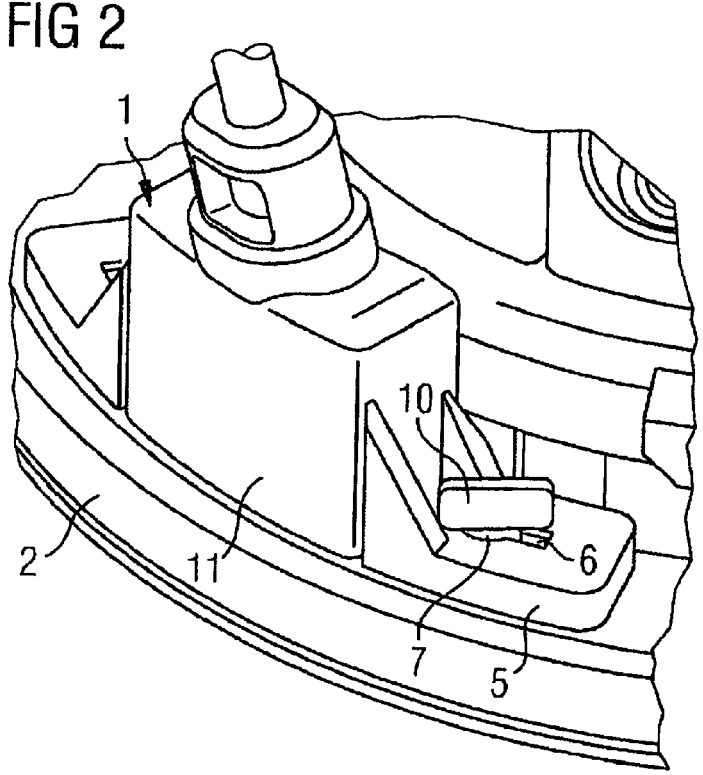
FIG. 2 shows a perspective view of the sensor head illustrated in FIG. 1.

FIG. 2 shows a perspective view of the sensor head 1 illustrated in FIG. 1. The fixing ring 2, the sensor head 1 with its housing 11 and the housing foot 5 can be seen again. A mainly slot-shaped or long-hole-shaped cutout 6, through which the twistable lug 7 extends, is made in the housing foot 5. The lug 7 is twisted to such an extent that the retaining piece 10 can no longer slip through the slot-shaped or long-hole-shaped cutout 6. The housing foot 5 is thus clamped between the retaining piece 10 of the twistable lug 7 and the fixing ring 2. The sensor head 1 is consequently fixed firmly in the predetermined position on the fixing ring 2.

FIG. 3 shows a lateral section through the sensor head 1. Here again, the sensor head 1 lies on the fixing ring 2. The actual sensor 8 can be seen in the sectional illustration of the sensor head 1. The sensor 8 is surrounded by the housing 11, which as a rule is made from plastic. The housing 11 comprises the housing feet 5. A Hall element or a magnetic resistance element can be used as the sensor 8, for example.

Here again, continuous cutouts 6 are made in the housing feet 5. The lug 9 which can be bent over is designed on the fixing ring 2 and is guided through the continuous cutout 6 of the housing foot 5. If the lug 9 which can be bent over is bent off in a U-shape, the retaining piece 10 comes to lie on the housing foot 5. The housing foot 5 is thus clamped between the retaining piece 10 of the lug 9 which can be bent over and the fixing ring 2. The sensor head 1 and the sensor 8 arranged therein come to lie in the predetermined position on the fixing ring 2. The lug 9 which can be bent over can be formed from the material of the fixing ring 2 itself by a lug-shaped structure being punched out from the fixing ring 2 in a predetermined position and bent in such a way that it forms the lug 9 which can be bent over, which can be guided through the continuous cutout 6. After the lug 9 has been bent over, the retaining piece 10 bears against the housing foot 5. The housing foot 5 is thus clamped firmly between the retaining piece 10 and the fixing ring 2.

FIG. 4 shows a top view of the fixing ring 2 with the sensor head 1. The cable 3 runs from the sensor head 1 to the plug 4, which makes it possible to connect the sensor 8 electrically to the rest of the vehicle electronics. Here again, the sensor head 1 is fixed to the fixing ring 2 by means of lugs 9 which can be bent over. The retaining pieces 10 of the lugs 9 which can be bent over, which are guided through the continuous cutouts 6 of the housing feet 5 of the sensor head 1, can be seen. Very accurate positioning of the sensor head 1 on the fixing ring 2 is made possible by fixing the sensor head 1 by means of a lug 9 which can be bent over or a twistable, T-shaped lug 7. As a result, expensive welding operations for fixing the sensor head 1 to the fixing ring 2 are no longer required. Fixing the sensor head 1 to the fixing ring 2 by means of a twistable lug 7 or a lug 9 which can be bent over therefore results in a considerable cost saving in relation to the fixing possibilities according to the state of the art.

I claim:

1. A fixing assembly, including a fixing ring, for a sensor head measuring speed of rotation or angle of rotation of a wheel in a motor vehicle, the sensor head comprising a housing made of plastic and having at least one housing foot fixed to the fixing ring by at least one fixing element, wherein the fixing ring serves for fixing the sensor head to a further component, wherein the at least one fixing element is configured as a T-shaped, twistable lug with a retaining piece, which lug extends through a continuous, mainly slot-shaped or long-hole-shaped cutout of the housing foot, the retaining piece of the twistable lug lying on the housing foot outside a direction of extension defined by the long-hole-shaped cutout and the housing foot being clamped between the retaining piece and the fixing ring.

2. The fixing assembly as claimed in claim 1, wherein the T-shaped, twistable lug is made of a metal.

3. The fixing assembly as claimed in claim 1, wherein the T-shaped, twistable lug is formed from a part of the fixing ring.

4. The fixing assembly as claimed in claim 1, wherein the T-shaped, twistable lug is welded or bonded to the fixing ring.

5. A fixing assembly, including a fixing ring, for a sensor head measuring speed of rotation or angle of rotation of a wheel in a motor vehicle, the sensor head comprising a housing made of plastic and at least one housing foot fixed to a fixing ring by means of at least one fixing element, wherein the fixing ring serves for fixing the sensor head to a further component, wherein the at least one fixing element is configured as a lug bent over in a U-shape with a retaining piece, wherein the lug extends through a continuous cutout of the housing foot, the retaining piece of the lug is bent over lying on the housing foot outside the continuous cutout, and the housing foot is clamped between the retaining piece and the fixing ring.

6. The fixing assembly as claimed in claim 5, wherein the lug is made of a metal.

7. The fixing assembly as claimed in claim 5, wherein the lug is formed from a part of the fixing ring.

8. The fixing assembly as claimed in claim 5, wherein the lug is welded or bonded to the fixing ring.

9. A fixing assembly, comprising:
a fixing ring comprising at least one fixing element that is configured as a T-shaped, twistable lug having a retaining piece; and
a sensor head for measuring the rotation of a wheel in a motor vehicle, the sensor head comprising a housing made of plastic and having at least one housing foot which has a continuous, generally elongated cutout, wherein the sensor head is configured to be fixed to the fixing ring by the fixing element, and wherein the fixing ring serves for fixing the sensor head to a further component;
wherein the lug is configured so as to extend though the cutout in the housing foot, at least a portion of the retaining piece lying on the housing foot beyond the cutout, and wherein the housing foot is compressively clamped between the retaining piece and the fixing ring.

10. A fixing assembly, comprising:
a fixing ring comprising at least one fixing element that is configured as a Jug bent over in a U-shape and having a retaining piece; and
a sensor head for measuring the rotation of a wheel in a motor vehicle, the sensor head comprising a housing made of plastic and having at least one housing foot which has a continuous cutout, wherein the sensor head is configured to be fixed to the fixing ring by the fixing element, and wherein the fixing ring serves for fixing the sensor head to a further component;
wherein the lug is configured so as to extend through the cutout in the housing foot, at least a portion of the retaining piece being bent over and lying on the housing foot beyond the cutout, and wherein the housing foot is compressively clamped between the retaining piece and the fixing ring.

* * * * *